United States Patent
Hinricher et al.

(10) Patent No.: US 12,172,571 B2
(45) Date of Patent: Dec. 24, 2024

(54) HEALTH INDICATOR SYSTEM FOR A SENSOR POD

(71) Applicant: Kodiak Robotics, Inc., Mountain View, CA (US)

(72) Inventors: Court Hinricher, Pacifica, CA (US); Nathan Berg, Sunnyvale, CA (US); James Hoffacker, San Carlos, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 0 days.

(21) Appl. No.: 17/883,269

(22) Filed: Aug. 8, 2022

(65) Prior Publication Data

US 2024/0042925 A1 Feb. 8, 2024

(51) Int. Cl.
| | | |
|---|---|---|
| *B60Q 1/50* | (2006.01) | |
| *B60Q 1/00* | (2006.01) | |
| *B60Q 5/00* | (2006.01) | |
| *G07C 5/08* | (2006.01) | |

(52) U.S. Cl.
CPC .......... *B60Q 1/543* (2022.05); *B60Q 1/0023* (2013.01); *B60Q 5/00* (2013.01); *G07C 5/0825* (2013.01); *B60Q 2400/20* (2013.01); *B60Q 2800/10* (2022.05)

(58) Field of Classification Search
CPC ........ B60Q 1/543; B60Q 1/0023; B60Q 5/00; B60Q 2800/10; B60Q 2400/20; G07C 5/0825
USPC ....................................................... 340/468
See application file for complete search history.

(56) References Cited

U.S. PATENT DOCUMENTS

| | | | | |
|---|---|---|---|---|
| 9,694,736 B2* | 7/2017 | Williams | ............... | B60Q 1/549 |
| 10,278,052 B2* | 4/2019 | Iwata | ..................... | H04W 4/90 |
| 10,328,847 B2* | 6/2019 | Yang | ..................... | B60Q 1/543 |
| 11,195,353 B2* | 12/2021 | Nix | ........................ | G01S 7/4813 |
| 11,458,889 B1* | 10/2022 | Angrand | ............... | B60K 35/60 |
| 2012/0248982 A1* | 10/2012 | Liao | .......................... | F21S 43/14 |
| | | | | 315/77 |
| 2013/0179035 A1* | 7/2013 | Adachi | ............... | B60Q 1/5035 |
| | | | | 701/36 |
| 2014/0100738 A1* | 4/2014 | Itatsu | ................... | G07C 5/0825 |
| | | | | 701/33.4 |

(Continued)

OTHER PUBLICATIONS

U.S. Appl. No. 17/826,000, filed May 26, 2022.

(Continued)

*Primary Examiner* — Zhen Y Wu
(74) *Attorney, Agent, or Firm* — Michele V. Frank; Venable LLP (57) ABSTRACT

A health indicator system for a sensor pod includes one or more sensors associated with the sensor pod, a sensor pod housing, an internal sensor status monitoring system configured to determine a status of at least one sensor of the one or more sensors, and a plurality of visual indicators located on at least one exterior surface of the sensor pod housing, the plurality of visual indicators configured to display a predetermined configuration based on the determined status of each of the one or more sensors. The plurality of visual indicators are located on the sensor pod housing at a level such that when an external operator standing on a ground surface approaches the vehicle, the plurality of visual indicators is within the external operator's field of view.

14 Claims, 4 Drawing Sheets

(56) References Cited

U.S. PATENT DOCUMENTS

| | | | |
|---|---|---|---|
| 2017/0113602 A1* | 4/2017 | Salter | B60Q 1/543 |
| 2017/0259753 A1 | 9/2017 | Meyhofer et al. | |
| 2017/0282784 A1* | 10/2017 | Foster | B60Q 1/2611 |
| 2019/0109988 A1 | 4/2019 | Lin et al. | |
| 2019/0163178 A1 | 5/2019 | Sidle et al. | |
| 2019/0210517 A1* | 7/2019 | Baker | B60Q 1/507 |
| 2019/0221058 A1 | 7/2019 | Nix et al. | |
| 2020/0156532 A1* | 5/2020 | Lee | G01S 17/931 |
| 2020/0269752 A1* | 8/2020 | Lee | B60Q 1/2615 |
| 2020/0302708 A1* | 9/2020 | Thompson | G07C 5/0825 |
| 2020/0380795 A1* | 12/2020 | Melen | G07C 5/0816 |
| 2020/0398759 A1 | 12/2020 | Konig et al. | |
| 2021/0031692 A1 | 2/2021 | Ning et al. | |
| 2021/0183185 A1* | 6/2021 | Vaidya | B60R 16/03 |
| 2021/0300238 A1* | 9/2021 | Latsch | B60Q 1/543 |
| 2021/0394774 A1 | 12/2021 | Zhang et al. | |
| 2022/0144185 A1* | 5/2022 | Burnette | H04N 23/90 |
| 2022/0262178 A1* | 8/2022 | Castillo | B60Q 1/543 |
| 2022/0307227 A1* | 9/2022 | Pfaff | B62D 33/06 |

OTHER PUBLICATIONS

International Search Report and Written Opinion mailed Nov. 8, 2023, directed to International Patent Application No. PCT/US2023/029720; 9 pages.

* cited by examiner

HEALTH INDICATOR SYSTEM FOR A SENSOR POD

TECHNICAL FIELD

The present disclosure relates to a health indicator system for a sensor pod.

BACKGROUND

Vehicles include side mirrors connected to the vehicle. Some side mirrors may be equipped to gather data and information, communicate with the vehicle, and may assist in navigating the vehicle.

BRIEF SUMMARY

A health indicator system for a sensor pod mounted near the door of a vehicle includes one or more sensors associated with the sensor pod, a sensor pod housing, an internal sensor status monitoring system configured to determine a status of at least one sensor of the one or more sensors, and a plurality of visual indicators located on at least one exterior surface of the sensor pod housing, the plurality of visual indicators configured to display a predetermined configuration based on the determined status of the at least one sensor, wherein the plurality of visual indicators are located on the sensor pod housing at a level such that when an external operator standing on a ground surface approaches the vehicle, the plurality of visual indicators is within the external operator's field of view.

An autonomous vehicle includes a main computer configured to operate the autonomous vehicle, one or more sensor pods each having a connecting assembly for coupling the sensor pod to the autonomous vehicle, a sensor pod housing, and one or more sensors configured to assist in operation of the autonomous vehicle, and a health indicator system configured to indicate to an external operator a health status of the main computer, the sensor pod, and the one or more sensors, the health indicator system including a plurality of visual indicators located on the sensor pod housing or the connecting assembly, the plurality of visual indicators configured to display a predetermined configuration based on the health status, wherein the predetermined configuration is different for a health status of the main computer, a health status of the sensor pod, and a health status of the one or more sensors such that the external operator may determine the health status by viewing the plurality of visual indicators.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The terms "forward" and "rearward" refer to relative positions of a vehicle. For example, forward refers to a position closer to front hood, front bumper, or front fender of the vehicle and rearward refers to a position closer to a rear bumper, rear trunk, or trailer of the vehicle.

The terms "upper," "lower," "left," and "right" refer to relative positions of a sensor pod with respect to a ground surface, as viewed from a position forward of the sensor pod. For example, "upper" refers to a position vertically above a "lower" position. For example, "left" refers to a position laterally to the left of a "right" position.

The term "side" as used herein may refer to a surface, wall, edge, border, boundary, etc., or simply to a general position or location with respect to the described component (e.g., not referring to any physical component).

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values and/or endpoints defining range(s) of values.

Vehicles include sensor pods connected to the vehicle. The sensor pods gather data and information, communicate with the vehicle, and may assist in navigating the vehicle. The sensor pods include a variety of sensors, cameras, and mirrors to gather the data and information, communicate with the vehicle, and where applicable, assist in navigating the vehicle. Each component of the sensor pod, including, for example, the sensors and cameras, has an operating status, also referred to herein as a health status. The health status may indicate whether the component of the sensor pod is operating within predetermined parameters, whether the component is sensing within calibrated parameters, whether the component has any internal software faults, whether software and/or hardware is operating within predetermined parameters, etc.

There remains a need for improved assemblies, systems, and methods for alerting external operators to the health status of the sensor pod. Therefore, as described herein, the sensor pod may include a health status indicator providing the health status to an external operator (e.g., a technician, vehicle operator, other user external to the sensor pod). The health status indicator may be a visual cue, an audio cue, or both. For example, but not limited to, the health status indicator may be a light pattern on the sensor pod, an audio signal emitted from the sensor pod, etc. By including the health status indicator on the sensor pod itself, an external operator may quickly and easily know the status of the sensor pod and the autonomous vehicle simply by performing a visual inspection of the sensor pod 12. No separate diagnostic or internal review of the sensor pod or computer of the vehicle is required to determine the status apart from the visual inspection performed by the external operator. That is, the particular predetermined configuration of the health status indicator will quickly indicate to the external operator the health status of the sensor pod, the sensors, and the vehicle, simply with visual inspection.

Figure 1:
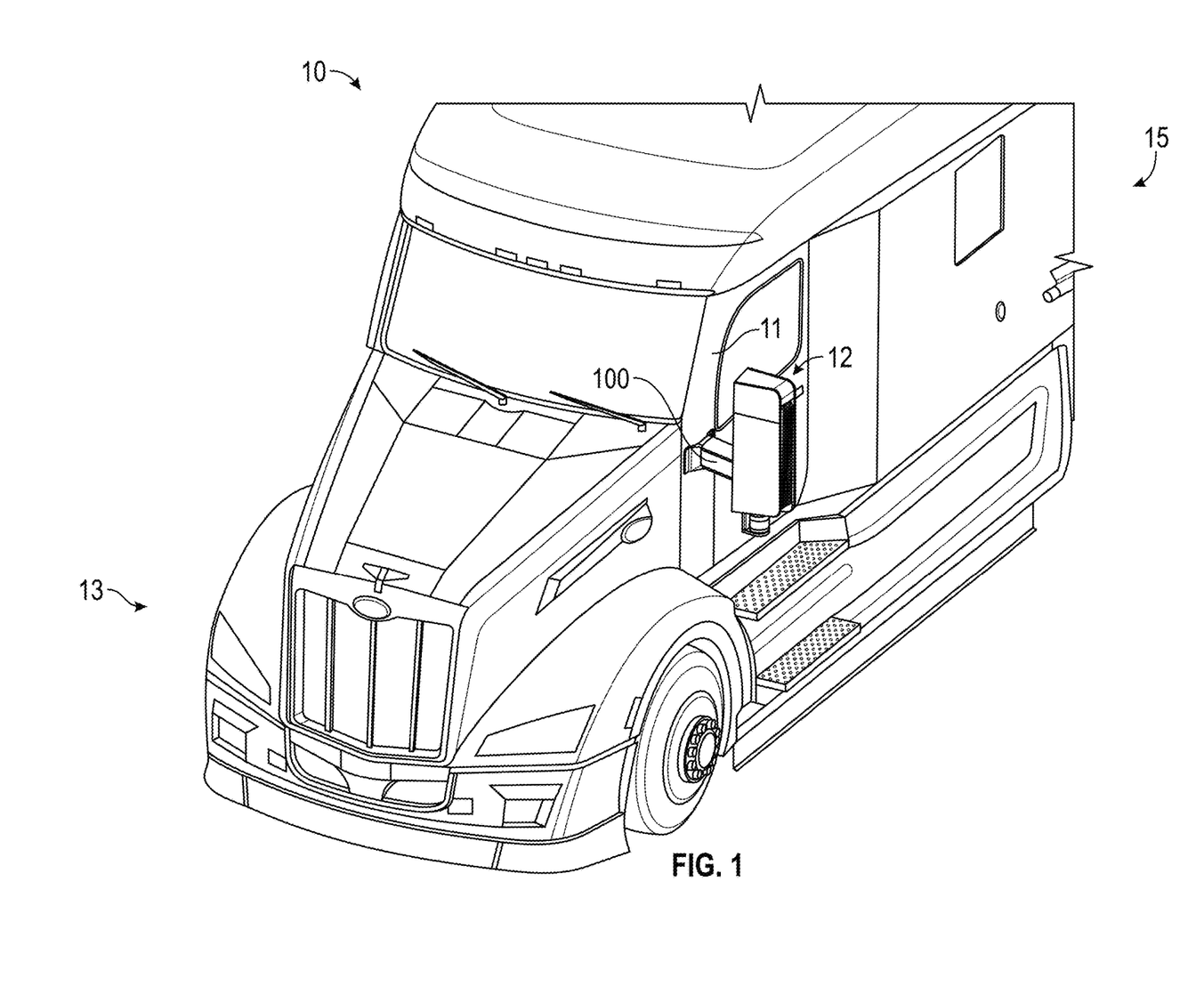
FIG. 1 illustrates a perspective view of a vehicle, according to an embodiment of the present disclosure.
Figure 2:
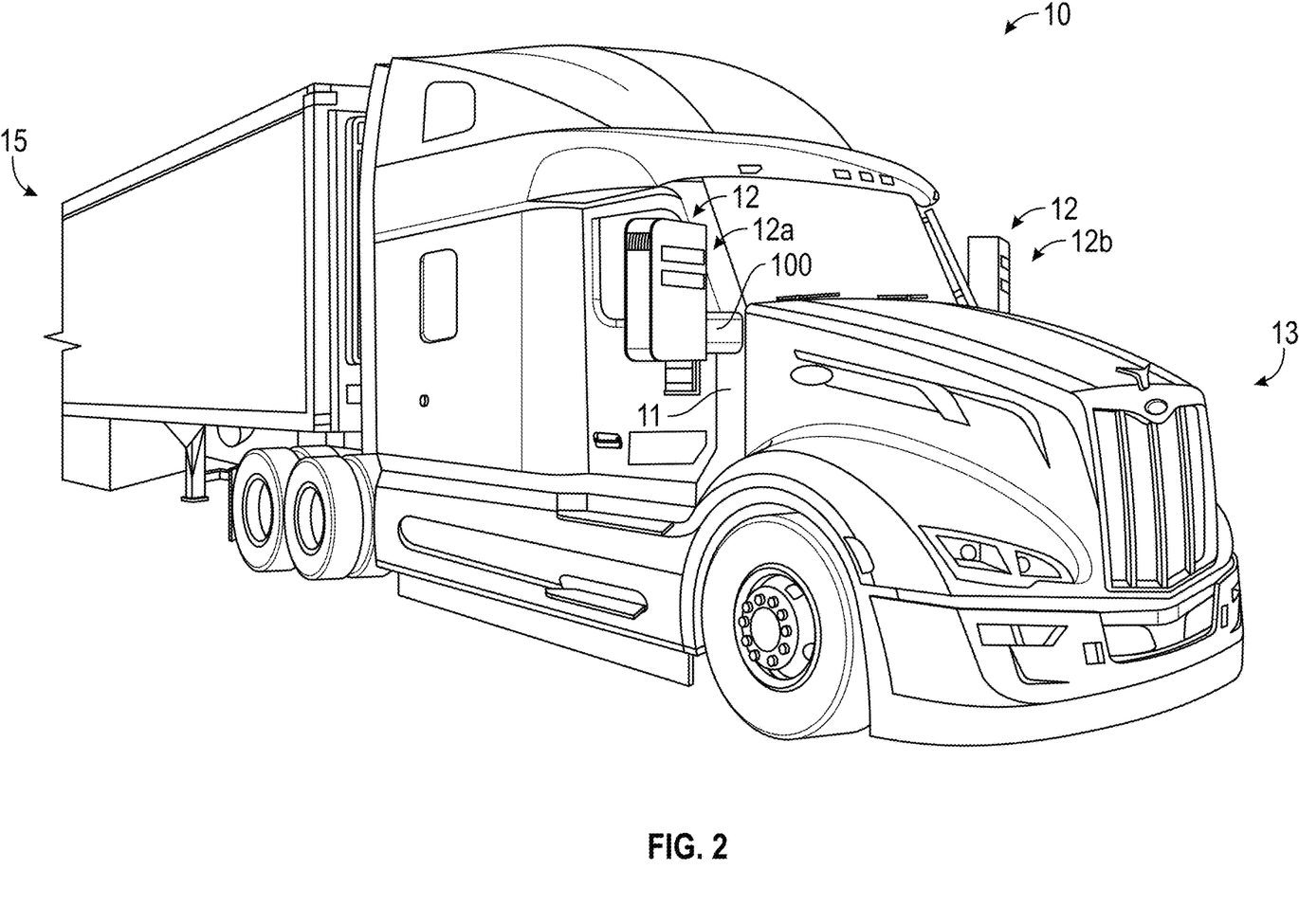
FIG. 2 illustrates a perspective view of a vehicle, according to an embodiment of the present disclosure.

FIGS. 1 and 2 illustrate a vehicle 10 having a sensor pod 12. Although a single sensor pod 12 is illustrated in FIG. 1 and two sensor pods 12 are illustrated in FIG. 2 (e.g., passenger side sensor pod 12*a* and driver side sensor pod 12*b*), more or fewer may be provided. The vehicle 10 may be any motor vehicle, such as, for example, but not limited to a car, a truck, a commercial truck, a bus, a watercraft (e.g., boat, ship, underwater vehicles, etc.), a motorcycle, an aircraft (e.g., airplane, helicopter, etc.), or a spacecraft. For ease of description, the vehicle 10 may be referred to herein as a truck 10. The vehicle may have a forward side 13, also referred to as a forward end or a front end, and a rear side 15, also referred to as a rear end, rearward end, or rearward side.

With continued reference to FIGS. 1 and 2, the sensor pod 12 may be a side mirror assembly mounted to the vehicle 10. The sensor pod 12 may assist in navigation of the vehicle 10. In some examples, the sensor pod 12 may assist in navigation in a manner that results in the vehicle 10 being autonomous, self-driving, semi-autonomous, non-autonomous with assisted navigation, etc., or combinations thereof. In this regard, the sensor pod 12 may include components, such as, but not limited to, sensors and mirrors, that may be useful for the operation of the vehicle, or any combination thereof. The vehicle 10 may use (via a processor or controller) data collected by the sensor pod 12 to navigate or to assist in navigating the vehicle 10 and to control the speed, direction, braking, and other functions of the vehicle 10. By way of example, the sensor pod 12 may be, or may include the sensors, cameras, mirrors, and associated components of, the sensor pod described in U.S. Patent Application Publication No. 2022/0144185, the contents of which are herein incorporated by reference in their entirety. Although illustrated as mounted to the A-pillar 11 of the frame of the vehicle 10 near the driver side and passenger side doors, the sensor pod 12 may be mounted to other locations on the vehicle 10, such as, for example, but not limited to, driver side and/or passenger side doors or other locations on the frame of the vehicle 10. The mounting site of the sensor pod 12 may preferably use existing mounting points for the truck 10, or may mount with appropriate hardware to the truck structure. The sensor pod 12 may be connected or coupled to the vehicle 10 with a connecting assembly 100. The sensor pod 12 and/or the connecting assembly 100 may be the same as the sensor pod and connecting assembly described in U.S. application Ser. No. 17/826,000, the contents of which are herein incorporated by reference in their entirety.

As will be described in more detail to follow, and as described in U.S. Patent Application Publication No. 2022/0144185, the sensor pod 12 includes a variety of sensors to monitor the surroundings of the vehicle 10. The sensors may include, for example, but not limited to, one or more cameras, one or more lidars, one or more radars, and one or more inertial measurement units (IMUs). The combined data from the sensors may be used by a processor to autonomously (or semi-autonomously) navigate or to assist a driver in navigating the roadway in a variety of light conditions, weather conditions, traffic conditions, load conditions, road conditions, etc. The sensors, mirrors, and other features of the sensor pod 12 are configured and oriented to provide a predetermined field of view and to provide reliable, accurate, and high quality data for autonomous and semi-autonomous driving. The specific sensor placement and the rigidity of the connecting assembly and support structure enable a sufficient field of view while reducing vibrational disturbances and allowing a high object detection rate and high quality positional data.

Figure 3:
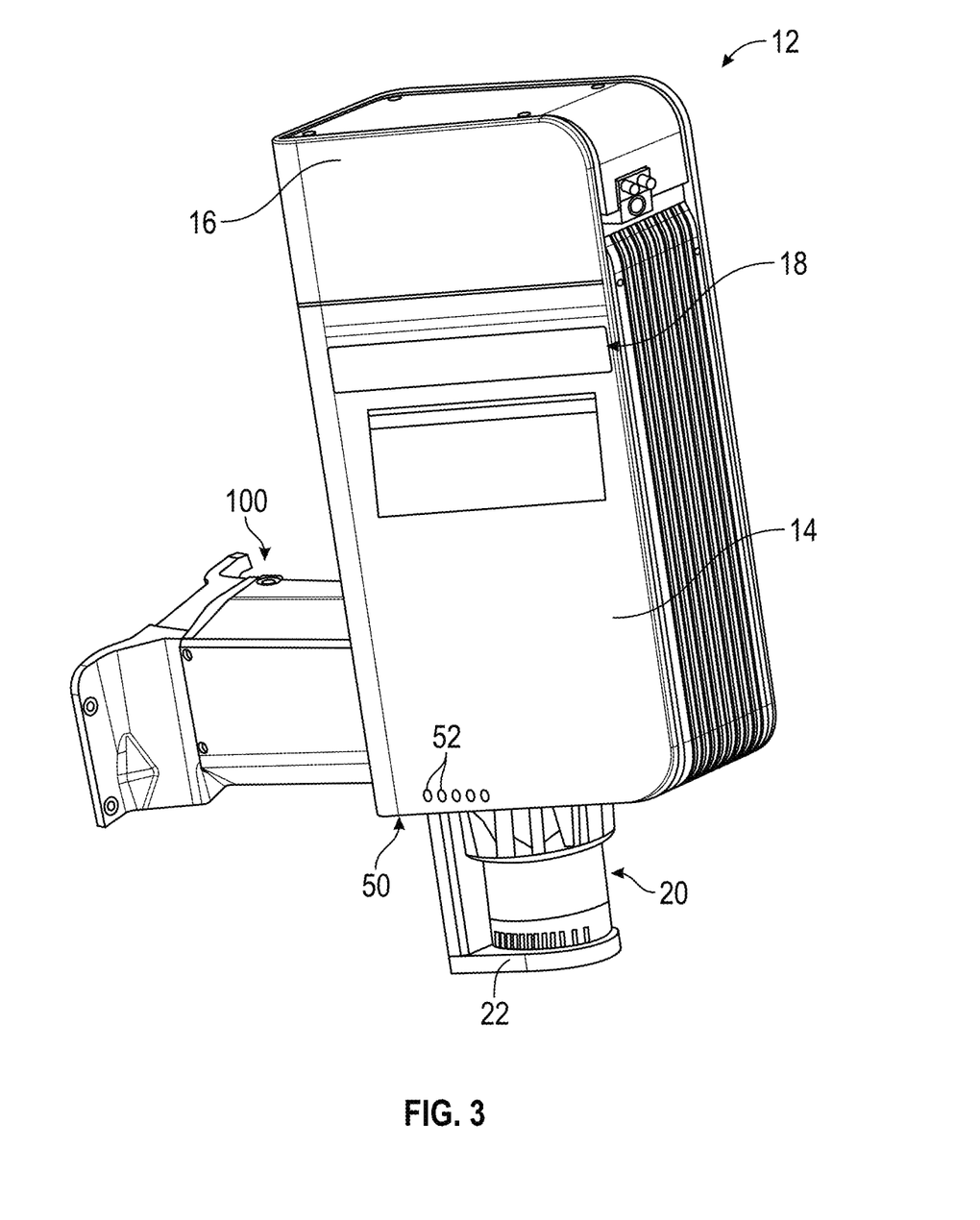
FIG. 3 illustrates a perspective view of sensor pod, according to an embodiment of the present disclosure.

FIG. 3 shows the forward side 13 (FIG. 2) of the sensor pod 12 and the connecting assembly 100. The sensor pod 12 includes a sensor pod housing 14. The sensor pod 12 may be releasably coupled to the vehicle 10 (FIG. 1) such that the sensor pod 12 may be installed, uninstalled, interchanged and/or replaced on the vehicle 10. The sensor pod 12 may be coupled to the vehicle 10 in a manner that allows the sensor pod 12 to be rotated or pivoted with respect to the vehicle 10, such as described in in U.S. application Ser. No. 17/826,000. The sensor pod housing 14 may house at least a portion of the sensors, cameras, mirrors, additional components, etc. required for operation of the sensor pod 12. For example, the sensor pod 12 may include a radar 16 housed in the sensor pod, a camera assembly 18 may include a single set of cameras or modular cameras located in different sections of the sensor pod, and a lidar 20. The lidar 20 may be located on a support 22 connected to a lower end of the sensor pod 12. The lidar 20 may be a spinning lidar. A second lidar, such as a scanning lidar, not visible, may be located within the sensor pod housing 14. The radar 16 may be a forward facing lidar. Although not visible in FIG. 3, a rear facing radar may be present on an opposing side of the sensor pod 12. The camera assembly 18 may include a plurality of cameras (not visible in FIG. 3) included in the camera assembly 18. For example, the camera assembly 18 may include one or more cameras facing the forward side 13 (FIG. 1), one or more cameras facing the rear side 15 (FIG. 1), and one or more cameras facing a lateral side perpendicular to the forward side and rear side. In some examples, the camera assembly may include narrow field of view camera(s), thermal camera(s), wide field of view camera(s), side-facing camera(s), and/or e-mirror camera(s). The aforementioned cameras are merely exemplary, and any number or type of cameras may be included to facilitate the autonomous, semi-autonomous, or assisted navigation of the vehicle 10, including, the cameras described in U.S. Patent Application Publication No. 2022/0144185.

The lidar, the radar, and the camera assembly all provide information and data to autonomously or semi-autonomously operate and navigate the vehicle 10 and/or provide information and data to assist in the navigation of the vehicle 10 where an operator is present inside the cab of the vehicle 10. For example, the lidar may assist in tracking vehicles or objects passing or being passed by the autonomous vehicle. In an example, the radar may enable the autonomous vehicle to navigate in difficult weather and light conditions. The radar may supplement the information from the camera assembly and lidar, which may have difficulty obtaining clear images and signals in the presence of certain weather conditions, such as fog, rain, and snow. The radar may also provide information regarding objects that are occluded in the camera and lidar data. In an example the cameras may track vehicles or objects and assist in tracking of the vehicles or objects.

With continued reference to FIG. 3, the sensor pod 12 may include a health indicator system 50. The health indicator system 50 may include the sensor pod 12 and features therein and/or features of the vehicle 10, as described in more detail with respect to FIG. 4. For example, the health indicator system shown generally at 50 may include a plurality of visual indicators 52. The plurality of visual indicators 52 may be lights. The plurality of visual indicators 52 may be light emitting diodes (LEDs). The plurality of visual indicators 52 may indicate a health status or operating status of one or more sensors of the sensor pod 12, as is described in more detail with respect to FIG. 4. The plurality of visual indicators 52 may be controlled to provide a predetermined configuration based on a determined health status of the one or more sensors of the sensor pod 12.

The predetermined configuration may indicate to an external operator whether the sensors, sensor pod, and/or the main computer of the vehicle are operating within normal predetermined parameters and/or whether remediation (e.g., calibration, repair, replacement, etc.) is required. A unique or distinct predetermined configuration may be associated with each possible determined health status of the sensors, sensor pod 12, and/or autonomous vehicle 10. Therefore, the external operator may be able to immediately determine the status of the sensors, sensor pod 12, and/or vehicle 10 by visual inspection alone of the sensor pod 12. That is, the external operator may match (either by way of, for example, memory or reference sheet) the displayed predetermined configuration with the particular health status of the sensors, sensor pod 12, and/or vehicle 10 to determine the current status of each of the aforementioned components. At that time, the external operator may initiate any necessary remedial actions (e.g., replacement, swapping sensors, repair, cleaning, calibration, resetting, troubleshooting, troubleshooting with a remote operator or server, diagnostic, etc.).

The predetermined configuration may be a light pattern or a light effect. In some examples, the light pattern or light effect includes one or more lights that are on and one or more lights that are off in a predetermined order. In some examples, the light pattern or light effect includes one or more lights of a first color, one or more lights of a second color, etc., in a predetermined order. In some examples, the light pattern or light effect comprises flashing or blinking. The flashing or blinking may be fast, slow, fading in or out, etc. The predetermined configuration may present any of the aforementioned patterns or effects, either alone or in any combination, to indicate to an external operator the health status of the sensor pod 12 and/or the health status of any sensor therein, in a manner to be described.

Once the external operator is advised of the health status of the sensor pod 12, the external operator, the sensor pod 12, and/or the autonomous vehicle 10, may be initiate a diagnostic and/or remedial actions, as required, to address the health status. For example, where the health status indicates malfunction or a need for calibration, diagnostic and/or recalibration of the sensors may be initiated to bring the health status into a properly operating health status.

For example, the predetermined configuration may include the plurality of visual indicators 52 displaying red in either a steady or blinking or flashing condition. This configuration may indicate one or more sensors with the sensor pod 12 are malfunctioning and/or require recalibration. Once the external operator is advised of the condition of the sensor pod 12, the external operator may initiate recalibration or diagnostic or other remedial action of the sensor pod 12 to determine which sensors are affected and/or to bring the affected sensors into properly operating health status. In some examples, the diagnostic, recalibration, and/or other remedial action may be initiated autonomously by the vehicle 10 and/or by the sensor pod 12.

In another example, the predetermined configuration may include the plurality of visual indicators 52 displaying yellow in either a steady or blinking or flashing condition. This configuration may indicate one or more sensors with the sensor pod 12 require maintenance. In another example, the predetermined configuration may include the plurality of visual indicators 52 displaying green in either a steady or blinking or flashing condition. This configuration may indicate the sensor pod 12 is in proper operating status and each of the one or more sensors therein are operating within predefined parameters.

The aforementioned colors and effects are merely exemplary. Any combination of colors and/or combination of effects may be employed to indicate a particular health status of the sensor pod 12. In some examples, a color and/or affect may be associated with a particular sensor within the sensor pod, a particular malfunction (e.g., hardware or software) of the sensor pod, etc. In some examples, patterns of colors and/or affects are employed to indicate the health status of the sensor pod 12.

Although shown on the forward side of the sensor pod 12, the visual indicators 52 may be employed on the rear side or other sides of the sensor pod 12 such that the visual indicator is visible from any and/or all sides of the vehicle 10. In some examples, the visual indicators 52 may be provided on the connecting assembly 100 (on any side of the connecting assembly 100). Additionally, as mentioned, in addition to, or in lieu of, the visual indicators 52, audio indicators may be provided. A key to the location of the visual indicators 52 and/or audio indicators is to easily and quickly alert the external operator to the health status of the sensor pod 12 and/or the vehicle 10. Thus, the location of the indicators may be on the sensor pod 12 and/or the connecting assembly 100 in a manner that allows for easy viewing during a visual inspection of the vehicle 10 (e.g., at eye level to an external operator standing on the ground surface). In some examples, the visual indicators 52 are employed on multiple sides of the sensor pod 12 and/or connecting assembly 100 such that an external operator approaching the vehicle from any side may quickly view the health status.

Figure 4:
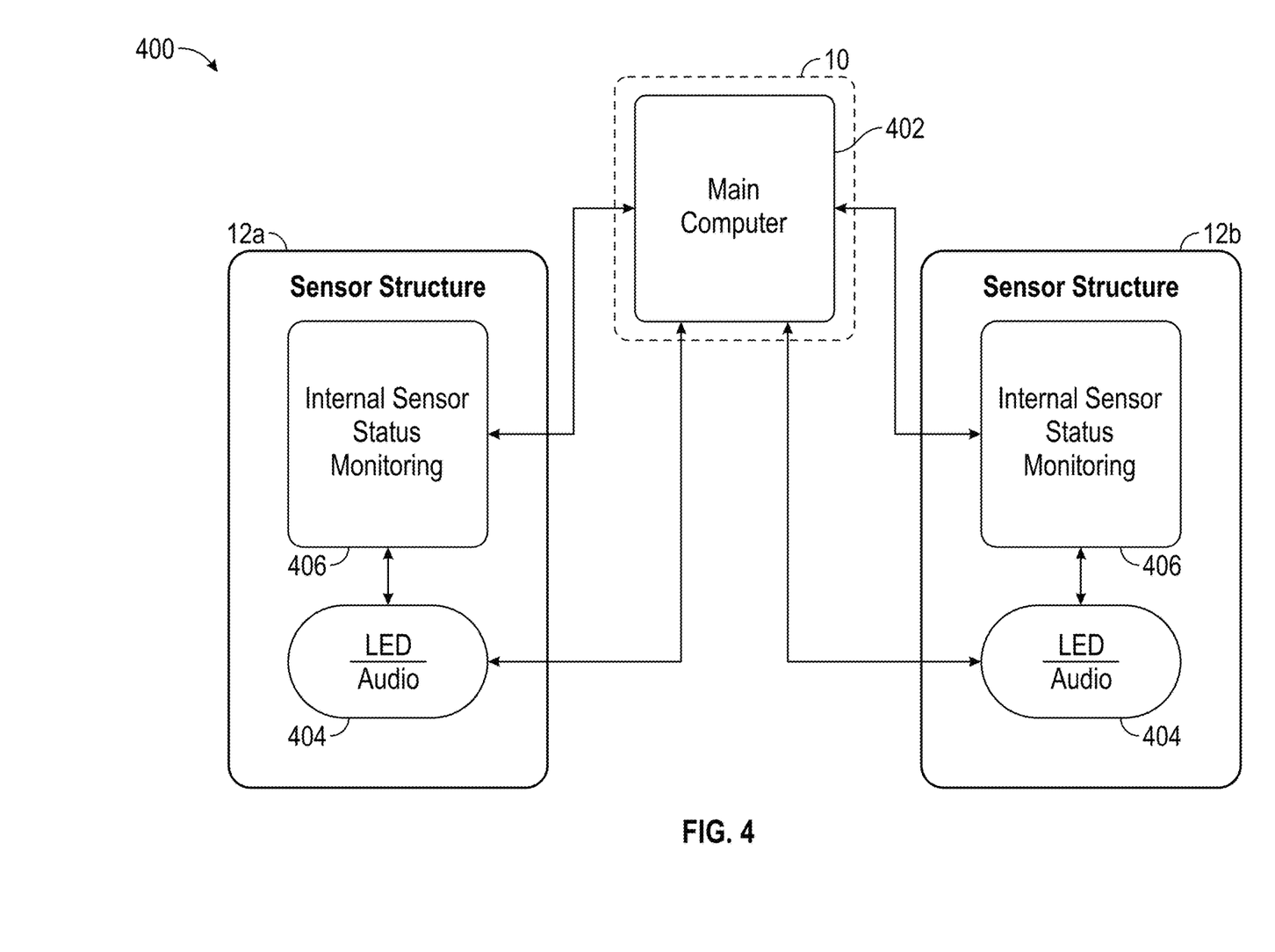
FIG. 4 illustrates a schematic view of a health indicator system for a sensor pod, according to an embodiment of the present disclosure.

FIG. 4 illustrates a health indicator system 400. The health indicator system 400 includes both the passenger side sensor pod 12a and the driver side sensor pod 12b, however, only a single sensor pod 12 and/or more than two sensor pods 12 may be included in the health indicator system 400. The health indicator system 400 may be comprised of components on the vehicle 10 and components on the sensor pods 12a, 12b. For example, the health indicator system 400 may include a main computer 402 that may be equipped on the vehicle 10. Additionally, the health indicator system 400 may include one or more health status indicators 404 associated with each of the sensor pods 12a, 12b. The one or more health status indicators 404 may be one or more LEDS, one or more visual indicators, such as those described with respect to FIG. 3, one or more audio indicators (e.g., speakers), or a combination thereof. The health indicator system 400 also includes an internal sensor status monitoring system 406 associated with each of the sensor pods 12a, 12b. The internal sensor status monitoring system 406 may be associated with each sensor of the sensor pod 12 and/or with all of the sensors of the sensor pod 12. The internal sensor status monitoring system 406 may be software and/or programming which evaluates a health condition of the sensors in the sensor pod 12 to determine whether the sensors are operating within predetermined operating parameters.

Accordingly, the health indicator system 400 monitors the status of each of the sensors within the sensor pods 12a, 12b by way of the internal sensor status monitoring system 406. Each sensor may have a predetermined operating parameter. When the status of the sensor is determined (by the internal sensor status monitoring system 406), the internal sensor status monitoring system 406 may communicate with the main computer 402 which in turn may communicate with the one or more health status indicators 404 to alert the external operator as to the health status of the sensors within the sensor pods 12a, 12b. Alternatively, the internal sensor status monitoring system 406 may communicate directly with the one or more health status indicators 404 to alert the external operator as to the health status of the sensors within the sensor pods 12a, 12b. As discussed previously, the particular health status displayed and/or broadcast by the one or more health status indicators 404 may be predetermined based on the health status determined by the internal sensor status monitoring system 406. For example, if the sensors are determined to be outside of predetermined operating parameters, the one or more health status indicators 404 may indicate a first status (e.g., red lights), if the sensors are determined to be inside of the predetermined operating parameters, the one or more health status indicators 404 may indicate a second status (e.g., green lights), if the sensors are determined to be in need of calibration, the one or more health status indicators 404 may indicate a third status (e.g., yellow lights), etc. As mentioned, a plurality of effects and colors and combinations thereof may be employed to indicate a wide variety of health statuses.

Additionally, the status of the main computer 402 may be determined. That is, the status of the software which operates the autonomous vehicle itself may be determined and the health status indicators 404 may include a predetermined configuration (distinct from or the same as the configurations relating to the sensors) which indicates the stats of the main computer 402. For example, if the main computer 402 has no faults and all programs are running properly and correctly, the health status indicators 404 may indicate a first configuration, if there are faults, a second configuration may be displayed on the health status indicators. In some examples, the health status indicators 404 may allow an external operator to distinguish between a status of the main computer 402 and a status of the sensors of the sensor pod 12. That is, the configuration of the health status indicators may be tailored to an individual condition for an individual component. Thus, as may be appreciated, a multitude of configurations for the health status indicators 404 are contemplated to cover a multitude of statuses of a multitude of components.

In some examples, concurrently with the configuration of the health status indicators 404, a signal may be sent by the main computer 402 and/or the sensor pod 12 to a main server or service or monitoring center of the autonomous vehicle 10 to alert a remote operator as to the status of the main computer 402 and/or the sensor pod 12. In this manner, either the local external operator and/or the remote operator may be apprised of the status of the vehicle 10 and the sensor pod 12 and may initiate the necessary remedial action (e.g., diagnostics, calibration, replacement, repair, etc.).

As discussed herein, people outside the vehicle (e.g., technicians, and other external operators) need to understand the status of the autonomous vehicle system in order to understand the vehicle's intentions. This includes understanding the operating status of the sensors of the sensor pod. If a sensor in the sensor pod is operating outside of predetermined operating parameters, the sensor may lead to faulty data and information being gathered, which, may lead to faulty and/or inaccurate instructions to the autonomous vehicle, which, in turn, could lead to catastrophic events (e.g., collisions, vehicle failure, etc.).

In order to easily and accurately indicate the status of the autonomous vehicle system, the system may include health status indicators, as described herein. For example, visual or audio indicators, such as, for example, LED indicators, may be mounted directly to the sensor structure (e.g., directly to the sensor pod as shown in FIG. 3) in a manner that is visible from the exterior of the vehicle. The visual indicator, such as the LEDs, may show a main computer status (e.g., the main computer 402) and/or a local sensor status (e.g., sensors of the sensor pod 12). As mentioned previously, the main computer status may be a status of the computer associated with controlling the autonomous vehicle and the local sensor status may be a status of the sensors associated with the sensor pod 12. The indicators may be arranged such that there is low latency. That is, there may be low latency of LED response due to the LEDs being connected directly to the health monitoring module in the sensor structure. Furthermore, the visual indicators may be visible from both sides of the vehicle. In some examples, the visual indicators may be about eye level to an external operating standing on a ground surface next to the vehicle such that the indicators are readily identifiable.

Accordingly, the health status may be shown for each sensor pod individually and independently of any other sensor pod included on the vehicle. That is, with reference to FIG. 4, the status indicated on the health status indicators 404 of sensor pod 12a may be different than the status indicated on the health status indicator 404 of the sensor pod 12b since the health statuses are individually and independently determined. In some examples, the statuses may be the same. In some examples, the status may be viewed before launch of the vehicle as part of a launch process to verify working order of the sensor pod 12. For example, the health status may be checked as part of a safety check prior to operation of the vehicle. Additionally, the status may be viewed and checked at stops when human intervention allows (e.g., at truck stops or at destinations of the vehicle). An external operator may check the health status of the sensors and main computer from an exterior of the vehicle and may initiate diagnostic and/or remedial actions as needed. Additionally, the status may signify that one or more sensors of the sensor pod requires calibration.

The health indicator system of the present disclosure allows for easily maintaining, monitoring, and remediating sensors of an autonomous or semi-autonomous vehicle. As mentioned, colors and effects may be employed to indicate the status. The health status of the sensors, sensor pod, and/or main computer may indicate a multitude of statuses. For example, the status may indicate operating within predetermined operating parameters, not operating within predetermined operating parameters, a need for calibration, a need for sensor cleaning, an obstruction of a sensor, degradation of a sensor, no signal being received or sent from sensor and/or main computer, external or internal failures of the sensors and/or main computers, dust, bugs, collisions, etc. That is, the health indicator system alerts an external operator to any status of the sensor pod and/or the main computer that is relevant to and affects the operation of the autonomous vehicle to anticipate issues that may arise in the navigation and/or operating of the autonomous vehicle before such issues arise.

Further aspects of the present disclosure are provided by the subject matter of the following clauses.

A health indicator system for a sensor pod mounted near the door of a vehicle includes one or more sensors associated with the sensor pod, a sensor pod housing, an internal sensor status monitoring system configured to determine a status of at least one sensor of the one or more sensors, and a plurality of visual indicators located on at least one exterior surface of the sensor pod housing, the plurality of visual indicators configured to display a predetermined configuration based on the determined status of the at least one sensor, wherein the plurality of visual indicators are located on the sensor pod housing at a level such that when an external operator standing on a ground surface approaches the vehicle, the plurality of visual indicators is within the external operator's field of view.

The health indicator system of the preceding clause, wherein the plurality of visual indicators are located on a forward surface of the sensor pod housing.

The health indicator system of any preceding clause, wherein the plurality of visual indicators are located on a forward surface and a rear surface of the sensor pod housing.

The health indicator system of any preceding clause, wherein the plurality of visual indicators comprise a plurality of LEDs.

The health indicator system of any preceding clause, wherein the predetermined configuration includes a color pattern, an effect pattern, or both.

The health indicator system of any preceding clause, wherein the color pattern is a solid color pattern or an alternating color pattern.

The health indicator system of any preceding clause, wherein the effect pattern is solid lights, blinking lights, or flashing lights.

The health indicator system of any preceding clause, further comprising an audio indicator configured to supplement the plurality of visual indicators.

An autonomous vehicle includes a main computer configured to operate the autonomous vehicle, one or more sensor pods each having a connecting assembly for coupling the sensor pod to the autonomous vehicle, a sensor pod housing, and one or more sensors configured to assist in operation of the autonomous vehicle, and a health indicator system configured to indicate to an external operator a health status of the main computer, the sensor pod, and the one or more sensors, the health indicator system including a plurality of visual indicators located on the sensor pod housing or the connecting assembly, the plurality of visual indicators configured to display a predetermined configuration based on the health status, wherein the predetermined configuration is different for a health status of the main computer, a health status of the sensor pod, and a health status of the one or more sensors such that the external operator may determine the health status by viewing the plurality of visual indicators.

The autonomous vehicle of the preceding clause, wherein the health indicator system is configured to determine the health status prior to launch of the autonomous vehicle and at predetermined intervals.

The autonomous vehicle of any preceding clause, wherein the health indicator system is part of a safety check system of the autonomous vehicle.

The autonomous vehicle of any preceding clause, wherein the health status of the main computer, the health status of the one or more sensors, and the health status of the one or more sensor pods are determined individually and independently such that the health indicator system shows a unique health status for each of the main computer, the one or more sensors, and the one or more sensor pods.

The autonomous vehicle of any preceding clause, wherein the health status indicates a fault in the main computer.

The autonomous vehicle of any preceding clause, wherein the health status indicates one of the one or more sensors requires replacement, repair, or calibration.

The autonomous vehicle of any preceding clause, wherein the plurality of visual indicators are located on the sensor pod housing or the connecting assembly a level such that when an external operator stating on a ground surface approaches the vehicle, the plurality of visual indicators is within the external operator's field of view.

The autonomous vehicle of any preceding clause, wherein the plurality of visual indicators are located on a forward surface of the sensor pod housing.

The autonomous vehicle of any preceding clause, wherein the plurality of visual indicators are located on a forward surface and a rear surface of the sensor pod housing.

The autonomous vehicle of any preceding clause, wherein the plurality of visual indicators comprise a plurality of LEDs.

The autonomous vehicle of any preceding clause, wherein the predetermined configuration includes a color pattern, an effect pattern, or both.

The autonomous vehicle of any preceding clause, wherein the color pattern is a solid color pattern or an alternating color pattern.

The autonomous vehicle of any preceding clause, wherein the effect pattern is solid lights, blinking lights, or flashing lights.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

What is claimed is:

1. An autonomous vehicle comprising:
   a main computer configured to operate the autonomous vehicle;
   one or more sensor pods each having:
     a connecting assembly for coupling the sensor pod to the autonomous vehicle;
     a sensor pod housing; and
     one or more sensors configured to assist in operation of the autonomous vehicle; and
   a health indicator system configured to indicate to an external operator a health status of the main computer, the sensor pod, and the one or more sensors, the health indicator system including:
     a plurality of visual indicators located on the sensor pod housing or the connecting assembly, the plurality of visual indicators configured to display a predetermined configuration based on the health status,
   wherein the predetermined configuration is different for a health status of the main computer, a health status of the sensor pod, and a health status of the one or more sensors such that the external operator may determine the health status by viewing the plurality of visual indicators.

2. The autonomous vehicle of claim 1, wherein the health indicator system is configured to determine the health status prior to launch of the autonomous vehicle and at predetermined intervals.

3. The autonomous vehicle of claim 1, wherein the health indicator system is part of a safety check system of the autonomous vehicle.

4. The autonomous vehicle of claim 1, wherein the health status of the main computer, the health status of the one or more sensors, and the health status of the one or more sensor pods are determined individually and independently such that the health indicator system shows a unique health status for each of the main computer, the one or more sensors, and the one or more sensor pods.

5. The autonomous vehicle of claim 1, wherein the health status indicates a fault in the main computer.

6. The autonomous vehicle of claim 1, wherein the health status indicates one of the one or more sensors requires replacement, repair, or calibration.

7. The autonomous vehicle of claim 1, wherein the plurality of visual indicators are located on the sensor pod housing or the connecting assembly a level such that when an external operator stating on a ground surface approaches the vehicle, the plurality of visual indicators is within the external operator's field of view.

8. The autonomous vehicle of claim 1, wherein the plurality of visual indicators are located on a forward surface of the sensor pod housing.

9. The autonomous vehicle of claim 1, wherein the plurality of visual indicators are located on a forward surface and a rear surface of the sensor pod housing.

10. The autonomous vehicle of claim 1, wherein the plurality of visual indicators comprise a plurality of LEDs.

11. The autonomous vehicle of claim 1, wherein the predetermined configuration includes a color pattern, an effect pattern, or both.

12. The autonomous vehicle of claim 11, wherein the color pattern is a solid color pattern or an alternating color pattern.

13. The autonomous vehicle of claim 11, wherein the effect pattern is solid lights, blinking lights, or flashing lights.

14. The autonomous vehicle of claim 1, further comprising an audio indicator configured to supplement the plurality of visual indicators.

* * * * *